2,930,862  3/1960  Samaniego .......................... 340/61
3,453,404  7/1969  Locker ............................. 200/61.22

*Primary Examiner*—John W. Caldwell
*Assistant Examiner*—Joseph E. Nowicki
*Attorney, Agent, or Firm*—J. Gibson Semmes

United States Patent [19]
Perez

[11] 4,042,909
[45] Aug. 16, 1977

[54] VEHICULAR DUAL TIRE OBSTRUCTION DETECTOR

[76] Inventor: Artemio R. Perez, 15771 SW. 297 St., Leisure City, Fla. 33030

[21] Appl. No.: 620,225

[22] Filed: Oct. 6, 1975

[51] Int. Cl.² .......................... B60Q 9/00; H01H 3/16
[52] U.S. Cl. .................................. 340/52 R; 340/61; 200/61.44
[58] Field of Search .................. 340/52 R, 58, 61; 200/61.23, 61.24, 61.41, 61.42, 61.44

[56]  References Cited
U.S. PATENT DOCUMENTS 2,213,782  9/1940  Kite ................................ 200/58
2,270,687  1/1942  Morse ............................. 200/52
2,479,371  8/1949  Kite ................................ 200/58
2,520,247  8/1950  Kite ................................ 200/58

[57] ABSTRACT

An obstruction safety detector having coactive spokes and flexible electrical conductors, mounted relative to dual tires of a vehicle for flash signalling the presence of an obstruction such as a stone, between adjacent tires forming the duals or tandem duals, including a chassis-mounted flexible detector adapted to deflection by the obstruction between rolling tires. The detector, upon deflection, closes an electrical switch in an electrical signalling circuit, which when thus closed, transmits intermittent current to a signal on the instrument panel of the vehicle, thereby warning of the obstruction.

1 Claim, 4 Drawing Figures

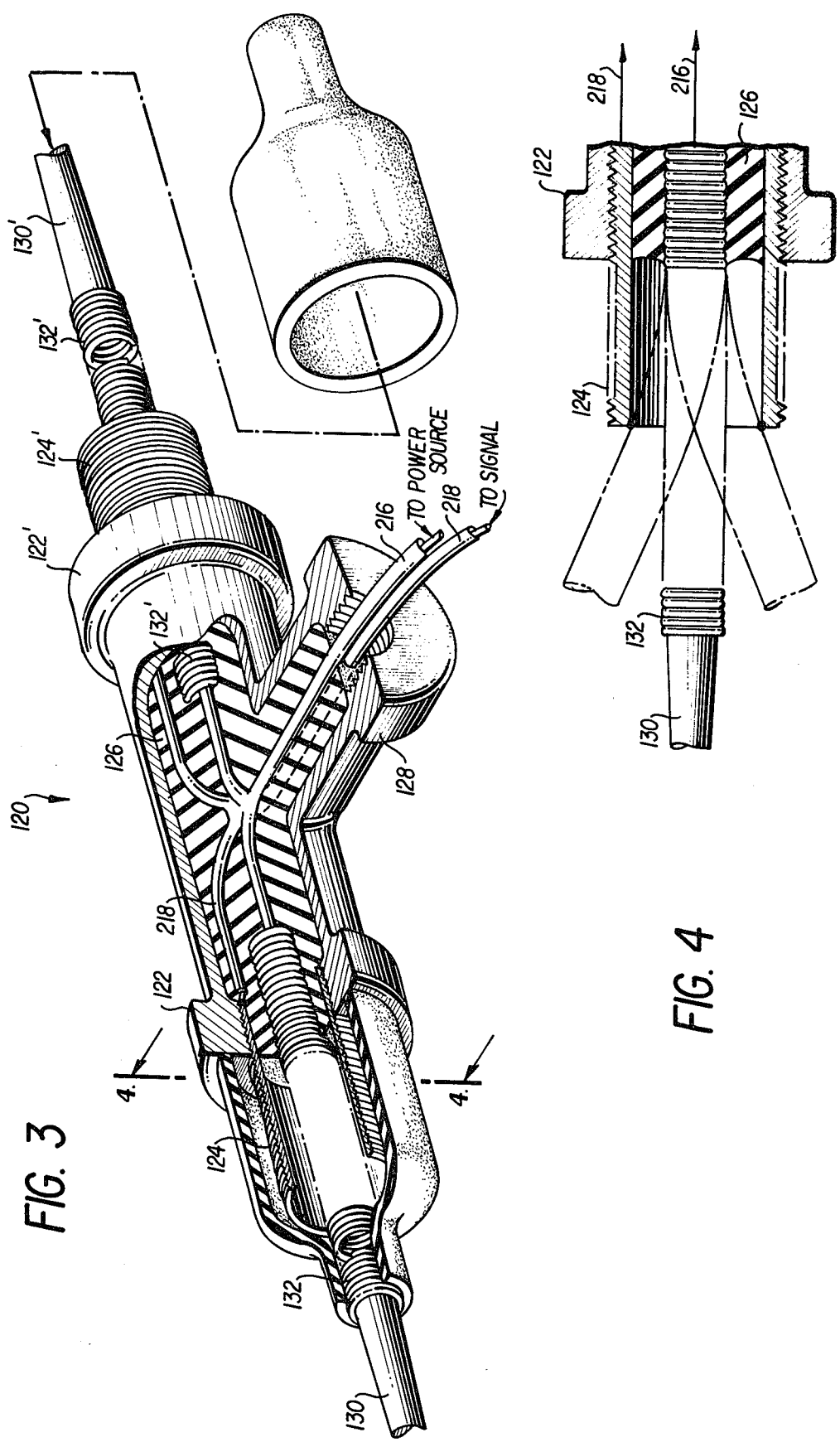

VEHICULAR DUAL TIRE OBSTRUCTION DETECTOR

DESCRIPTION OF THE PRIOR ART

Whereas known devices have been created for detecting irregularities between one or more tires of the vehicle, reference Wilson U.S. Pat. No. 2,593,824, none has been devised for sensing the presence of an obstruction such as a stone lodged between tires, forming the dual on a vehicle such as a truck or airplane. Related devices, not anticipatory of invention include those which are adapted to ascertain the presence of metal in a tire tread, or overload of a vehicle, reference Chotro U.S. Pat. Nos. 2,779,013 and Cowie 3,197,733.

The present invention is distinguishable on the grounds of unique configuration, disposition and coaction, relative to the chassis and moving wheels of the vehicle.

BRIEF DESCRIPTION OF THE DRAWINGS:

FIG. 3 is an enlarged perspective of the housing component of the invention of FIGS. 1 and 2, a portion thereof being cut away to reveal the mounting of the detector spokes;

FIG. 4 is a vertical sectional view of a portion of the housing of FIG. 3 taken along the line 3—3 thereof, illustrative of the deflection characteristic of a spoke to close the electrical safety signaling circuit.

Figure 1:
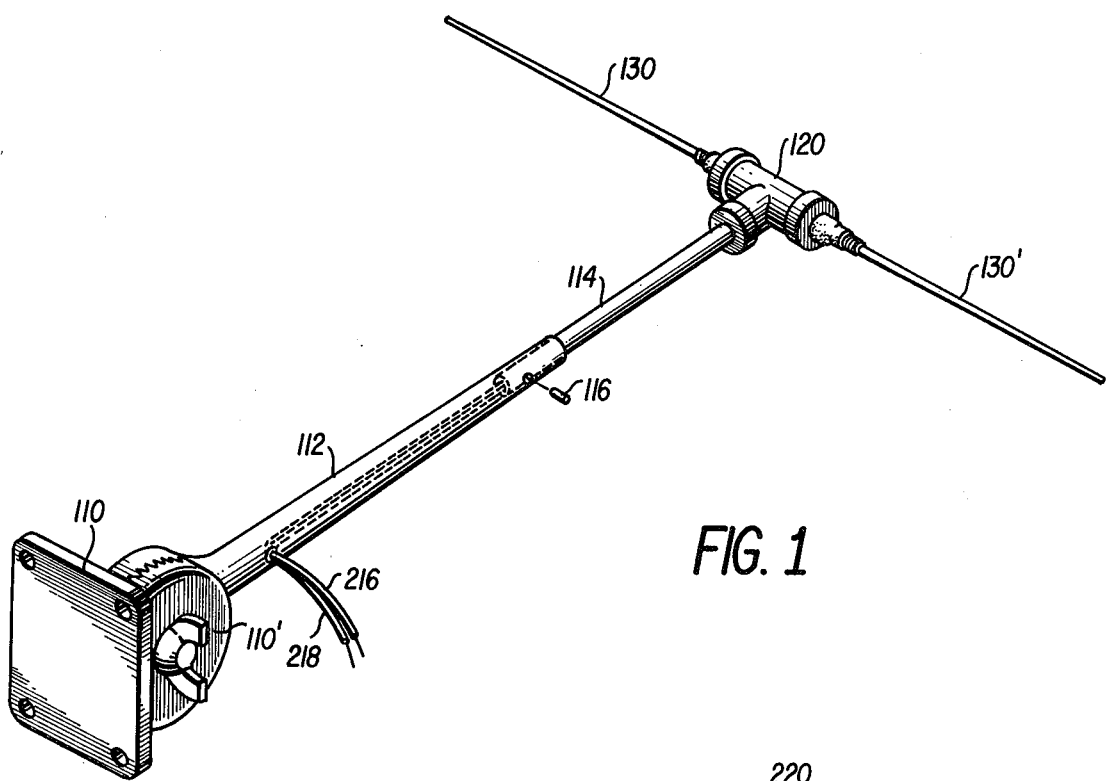
FIG. 1 is a view of the invention in perspective, detached from vehicle chassis.
Figure 2:
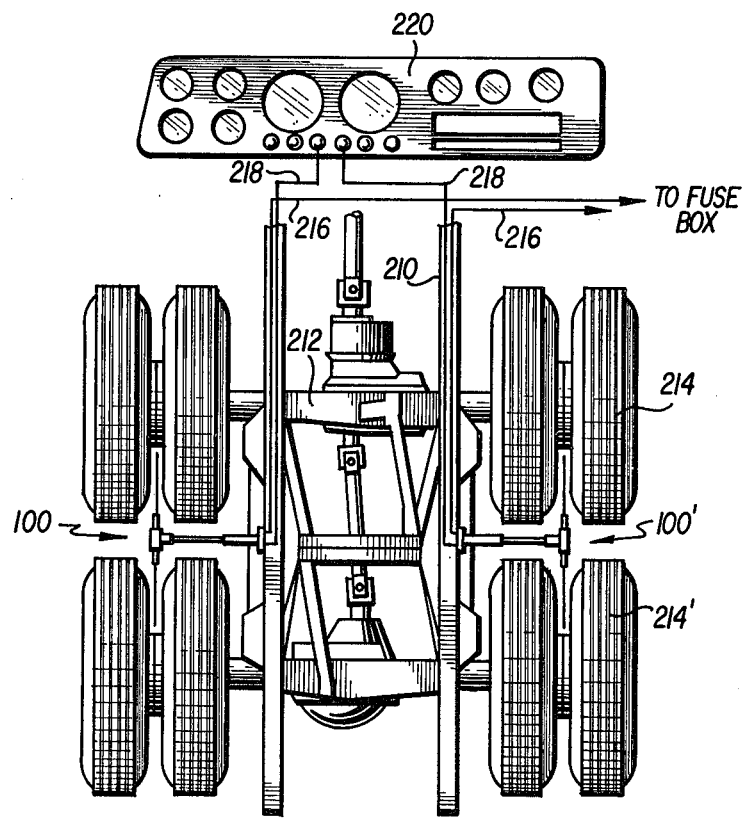
FIG. 2 is a top plan view showing the invention in its mounted relationship to the tractor-trailer vehicle, two corresponding detectors being applied to opposite duals, forming the tandem arrangement shown.

DESCRIPTION OF THE PREFERRED EMBODIMENTS:

With reference to FIG. 1, the basic invention comprises a mounting bracket 110 having affixed thereto an extension 110', providing means for arcuately adjusting the detector arm 112 relative to the amount and the chassis of the vehicle as will be apparent from reference to FIG. 2. The detector arm 112 houses in part the electrical conductors 216 and 218, which said conductors extend throughout the combined length of the arm 112 and its telescoping extension 114, said extension 114 being suitably secured by the detent 116 onto the detector arm 112 transversely of the chassis, dependent upon the disposition of the dual tires, relative thereto. The detector arm extension 114 is threadedly secured to the T-shaped housing 120 by threaded engagement thereto. Housing 120 comprises corresponding ends 122—122', said ends being adapted to secure the nipples 124—124' in extension thereof. Obstruction deflectors 130 and 130' are oppositely disposed relative to each other and in anchor connection with the interior of the Tee housing 120 by means of flexible helices 132—132', the seated end of each of which is embedded in a dielectric plastic 126 such as the well-known Bakelite. Deflectors 130—130' and associated helices 132—132' are in electrical connection with the conductor 216 whereby upon deflection thereof, one or the other helices will momentarily contact the electrically conducting nipples 124 to close the electrical circuit via conductor 218 by grounding same, to effect energization of the signalling lamp which is disposed appropriately in the instrument panel 220. This indicates to the operator of the vehicle, upon flashing of the signal lamp on the dash, that one or more sets of dual tires has an obstruction such as a rock, lodged therebetween. An obstruction safety detector having coactive spokes and flexible electrical conductors, mounted relative to dual tires of a vehicle for flash signalling the presence of an obstruction such as a stone, between adjacent tires forming the duals or tandem duals, including a chassis-mounted flexible detector adapted to deflection by the obstruction between rolling tires. The detector, upon deflection, closes an electrical switch in an electrical signalling circuit, which when thus closed, transmits intermittent current to a signal on the instrument panel of the vehicle, thereby warning of the obstruction. While not fully demonstrated by the drawings, it will be apparent from reference to FIGS. 3 and 4 that each deflector may be deflected in an axially rotary direction, relative to the Tee housing or in any other radial direction covering the 360° defined by the conductor extensions 124—124'.

Clearly, the invention may be applied to any vehicle, be it aircraft or conventional tractor-trailer, employing one or more dual tires in support of the carrier by axle. More appropriately the invention has been defined to show the use of deflectors, extending in opposite directions to service in-line duals which are disposed in tandem as on the conventional tractor-trailer cargo carrier, which, when moving at high speeds, is most susceptible of picking up rocks in the critical opposed wall area, thereby providing a dangerous threat to following vehicles.

I claim:

1. A vehicular tandem dual tire obstruction signal detector for mounting upon the chassis of a wheeled vehicle wherein said vehicle has an instrument panel and is supported by tandem dual tires, comprising:
   A. electrical circuit within the vehicle, including an instrument panel signal therein; and
   B. mechanical switch means in the circuit, said switch means comprising plural flexible deflector spokes secured in opposed coaxial relation to each other, each being held within corresponding flexible conductor helices, conductive nipples concentrically disposed with respect to the helices, the respective opposed helices and nipples being adapted to mounting upon the chassis of the vehicle whereby to dispose the respective spokes adjacent inner walls of the tandem duals,
   C. said switch means being normally in the off position, said deflector spokes being disposed oppositely between the tandem dual tires, adjacent the walls thereof, whereby upon movement of the vehicle and lodgment of a foreign obstruction between dual tire walls, at least one said deflector spoke is intermittently deflected to close the switch via the conductive nipples to on and thereby activate the signal.

* * * * *